(12) United States Patent
Anshel et al.

(10) Patent No.: US 10,523,440 B2
(45) Date of Patent: **\*Dec. 31, 2019**

(54) SIGNATURE GENERATION AND VERIFICATION SYSTEM

(71) Applicant: SECURERF CORPORATION, Shelton, CT (US)

(72) Inventors: Iris Anshel, Tenafly, NJ (US); Dorian Goldfeld, Tenafly, NJ (US)

(73) Assignee: SECURERF CORPORATION, Shelton, CT (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/270,930

(22) Filed: Sep. 20, 2016

(65) Prior Publication Data
US 2017/0085387 A1    Mar. 23, 2017

Related U.S. Application Data

(60) Provisional application No. 62/221,881, filed on Sep. 22, 2015.

(51) Int. Cl.
*H04L 9/32*    (2006.01)
*H04L 29/06*    (2006.01)

(52) U.S. Cl.
CPC ........ *H04L 9/3247* (2013.01); *H04L 63/0435* (2013.01); *H04L 63/061* (2013.01);
(Continued)

(58) Field of Classification Search
CPC ............... H04L 9/3247; H04L 63/0435; H04L 63/061; H04L 63/0876; H04L 63/123; H04L 63/126
See application file for complete search history.

(56) References Cited

U.S. PATENT DOCUMENTS 7,649,999 B2 \*   1/2010   Anshel ................. H04L 9/0841
                                                    380/285
9,094,429 B2 \*   7/2015   Brown ................. H04L 51/063
                        (Continued)

OTHER PUBLICATIONS

SecureRF white paper, "Security in Low Resource Environments," Jan. 2016, pp. 1-5.\*
(Continued)

*Primary Examiner* — Luu T Pham
*Assistant Examiner* — Canh Le
(74) *Attorney, Agent, or Firm* — DLA Piper LLP US (57) ABSTRACT

Technologies are generally described for methods and devices for generating a final signature. The methods may comprise receiving a message by a processor. The methods may comprise generating a random number by a random number generator. The methods may comprise forwarding, by the processor, the random number to a cloaking element generator. The methods may comprise forwarding, by the processor, a private key to the cloaking element generator. The methods may comprise forwarding, by the processor, a group to the cloaking element generator. The methods may comprise forwarding, by the processor, a homomorphism to the cloaking element generator. The methods may comprise processing, by the cloaking element generator, the random number, the group, the private key, and the homomorphism to produce a cloaking element. The methods may comprise applying the cloaking element to transform the message into the final signature.

14 Claims, 3 Drawing Sheets

(52) U.S. Cl.
CPC ........ *H04L 63/0876* (2013.01); *H04L 63/123* (2013.01); *H04L 63/126* (2013.01)

(56) References Cited

U.S. PATENT DOCUMENTS

2005/0193207 A1* 9/2005 Buck ..................... H04L 9/321
713/178
2007/0058803 A1* 3/2007 Suga .................. H04L 63/0442
380/30

OTHER PUBLICATIONS

Matvei Kotov, "Attack on kayawood protocol: uncloaking private keys," Apr. 26, 2019, pp. 1-10. (Year: 2019).*

Iris Anshel, "Post quantum group theoretic cryptography," Nov. 10, 2016, pp. 1-11. (Year: 2016).*

* cited by examiner

Fig. 1

Fig. 2

SIGNATURE GENERATION AND VERIFICATION SYSTEM

CROSS-REFERENCE TO RELATED APPLICATION

This application claims priority to Provisional Application No. 62/221,881 filed Sep. 22, 2015, titled "Algebraic Eraser Digital Signature System", the entirety of which is hereby incorporated by reference.

BACKGROUND

In a symmetric or private key encryption communication system, two devices in possession of a common secret or private key can perform both encryption and decryption using the secret key. A plaintext message may be encrypted using the secret key to produce encrypted plaintext or a cyphertext. The cyphertext may be decrypted using the secret key to re-produce the plaintext. The cyphertext may be accompanied by a signature. A receiver of the signature may process the signature to verify the authenticity of the sender.

SUMMARY OF THE INVENTION

One embodiment of the invention is a method for generating a final signature. The methods may comprise receiving a message by a processor. The methods may comprise generating a random number by a random number generator. The methods may comprise forwarding, by the processor, the random number to a cloaking element generator. The methods may comprise forwarding, by the processor, a private key to the cloaking element generator. The methods may comprise forwarding, by the processor, a group to the cloaking element generator. The methods may comprise forwarding, by the processor, a homomorphism to the cloaking element generator. The methods may comprise processing, by the cloaking element generator, the random number, the group, the private key, and the homomorphism to produce a cloaking element. The methods may comprise applying the cloaking element to transform the message into the final signature.

Another embodiment of the invention includes a signature generator. The signature generator may comprise a memory. The signature generator may comprise a random number generator. The random number generator may be effective to generate a random number. The signature generator may comprise a cloaking element generator. The signature generator may comprise a processor. The processor may be configured to be in communication with the memory, the random number generator, and the cloaking element generator. The processor may be effective to receive a message. The processor may be effective to forward the random number to the cloaking element generator. The processor may be effective to forward a private key to the cloaking element generator. The processor may be effective to forward a group to the cloaking element generator. The processor may be effective to forward a homomorphism to the cloaking element generator. The cloaking element generator may be effective to process, the random number, the group, the private key, and the homomorphism to produce a cloaking element. The processor may be effective to apply the cloaking element to the message to transform the message into the final signature.

Another embodiment of the invention are methods to generate a verification result for a signature. The methods may comprise receiving, by a processor, a final signature that includes a cloaked signature and a message. The methods may comprise forwarding, by the processor, the message to a message encoder. The methods may comprise forwarding, by the processor, a group to the message encoder. The methods may comprise processing, by the message encoder, the group and the message to produce an encoded message. The methods may comprise forwarding, by the processor, the encoded message to an encoded message image generator. The methods may comprise processing, by the encoded message image generator, the encoded message to produce an ordered pair. The ordered pair may take the same form as a public key. The methods may comprise forwarding, by the processor, the ordered pair to a signature verifier. The methods may comprise forwarding, by the processor, the public key to the signature verifier. The methods may comprise forwarding, by the processor, the final signature to the signature verifier. The methods may comprise processing, by the signature verifier, the public key and the cloaked signature to produce a first computation. The methods may comprise processing, by the signature verifier, the ordered pair and the public key to produce a second computation. The methods may comprise comparing, by the processor, the first and second computation to generate the verification result.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 1:
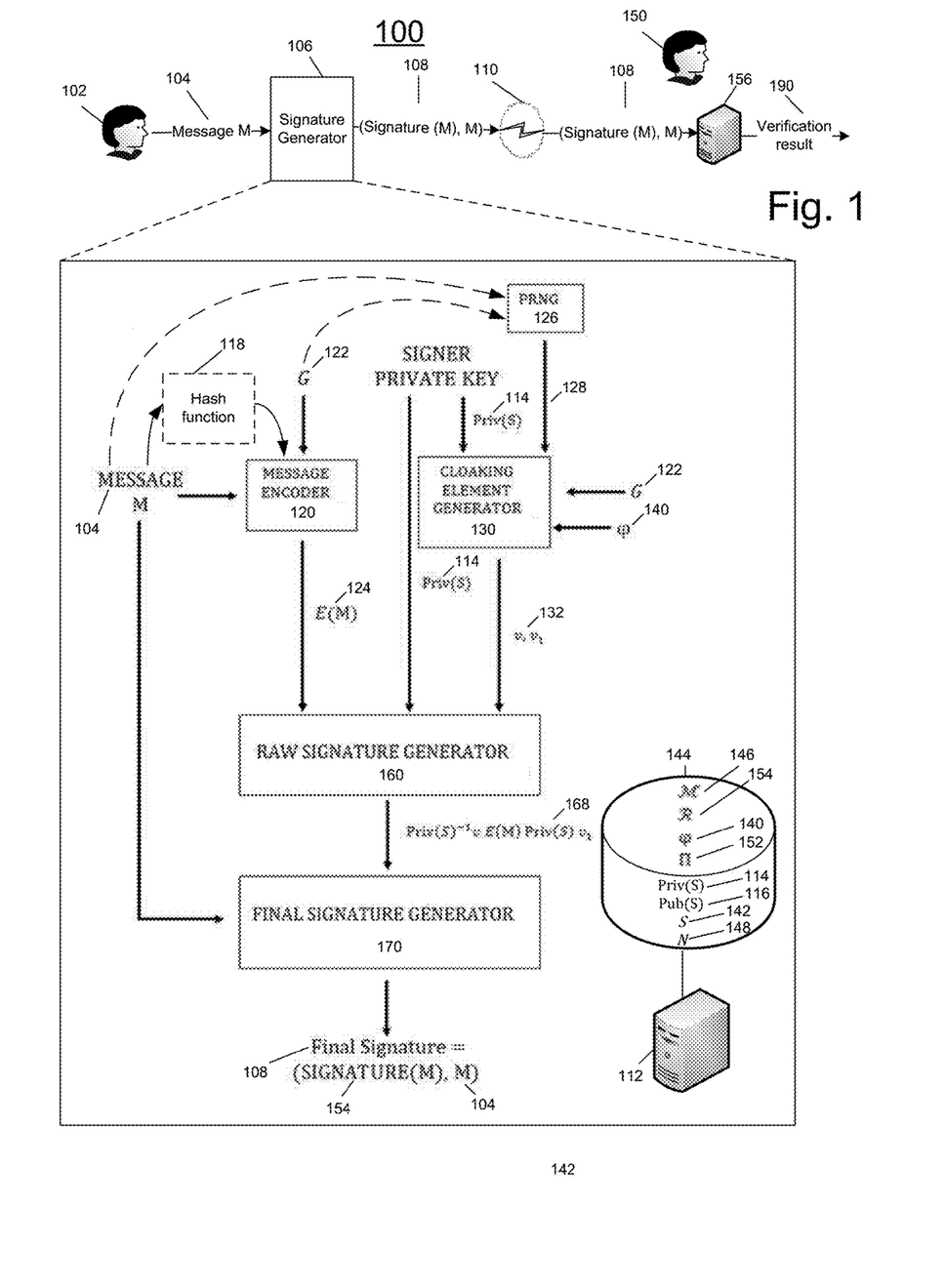
FIG. 1 is a drawing of a communication system in accordance with an embodiment of the invention.

FIG. 1 is a drawing of a communication system 100 in accordance with an embodiment of the invention. Communication system 100 may include a signature generator 106, a network 110, and/or a processor 156. Network 110 may include, for example, a wireless network, a wired network, the Internet, a cellular network, a near field communication (NFC) network, a radio frequency identification (RF-ID) network, a cloud computing environment, etc. Signature generator 106 may include a processor 112, a memory 144, a pseudo random number generator 126, a hash function 118, a message encoder 120, a cloaking element generator 130, a raw signature generator 160, and a final signature generator 170, all configured to be in communication with each other. Memory 144 may store a group S 142, a group G 122, a group $\mathcal{M}$ 146, a group N 148, a homomorphism φ 140, a homomorphism Π 152, a signer private key Priv (S) 114, a public key Pub(s) 116, and an obscuring rewriting operation $\mathcal{R}$ 154.

As explained in more detail below, the elements stored in memory may satisfy the following properties:

A group S may be a group that acts on a group $\mathcal{M}$;

A group G may be equipped with an obscuring rewriting method denoted $\mathcal{R}$;

Group $\mathcal{M}$ may be acted on by the group S;

A group N may be equipped with a one-way homomorphism Π: M→N; and

φ may be a homomorphism where φ: G→$\mathcal{M} \rtimes$ S.

Group S 142, group G 122, group $\mathcal{M}$ 146, group N 148, homomorphism φ 140, homophorphism Π 152, signer private key Priv (S) 114 and obscuring rewriting operation $\mathcal{R}$ 154 may be utilized in computations such as an Algebraic Eraser and an E-function of E-multiplication as described below.

An Algebraic Eraser may be an instance of a one-way function on which an asymmetric encryption protocol may be based. An Algebraic Eraser may include a specified 6-tuple ($\mathcal{M} \rtimes$ S, N, Π, E, A, B) where M and N are monoids, S is a group that acts on $\mathcal{M}$ (on the left), $\mathcal{M} \rtimes$ S denotes the semi-direct product, A and B denote submonoids of $\mathcal{M} \rtimes$ S, and Π denotes a monoid homomorphism from M to N. The E-function, also called E-multiplication, is defined by $$E:(N \times S) \times (\mathcal{M} \rtimes S) \rightarrow (N \times S)$$

$$E((n,s),(m_1,s_1))=(n\Pi(^s m_1), s \, s_1)=(n,s)*(m_1,s_1).$$

It is observed that the E-function satisfies the following identity:

$$E((n,s),((m_1,s_1) \cdot (m_2,s_2)))=E(E((n,s),(m_1,s_1)),(m_2,s_2)).$$

In system 100, a first user 102 may input a message M 104 into signature generator 106. For example, user 102 may use processor 112 to input message 104. As discussed in more detail below, signature generator 106 may be effective to transform message 104 and a signer private key Priv(S) 114 into a final signature 108 shown as "(Signature (M), M)". Signature generator 106 may then send final signature 108 through network 110 to processor 156. A user 150 in communication with processor 156 may receive and verify final signature 108 to produce a verification result 160.

Signer private key Priv(S) 114 may be related to a signer public key Pub(S) 116. Signer private key Priv(S) 114 and signer public key Pub(S) 116 may be a fixed private/public key pair that may be computed with use of the algebraic eraser discussed above. Signer private key Priv(S) 114 may be an element in group G 122, i.e.:

$$Priv(S) \in G$$

Signer private key Priv(S) 114 may be chosen in a manner so that the search space for signer private key Priv(S) 114 is difficult to enumerate. Signer public key Pub(S) 116 may be derived using E-multiplication on signer private key Priv(S) 114, i.e.:

$$Pub(S)=(1,1)*(M_{Priv(S)}, s_{Priv(S)}),$$

where * denotes E-multiplication, as described above and given any element v∈G, let $M_v$, and $s_v$ be defined by φ(v)=($M_v$, $s_v$).

Processor 112 may forward message M 104 and group G 122 to message encoder 120. In some examples, hash function 118 may receive message M and forward a hash of message M to message encoder 120. Message encoder 120 may associate a unique element in a free subgroup of group G 122 to message M 104 to produce an encoded message E(M) 124. Encoded message E(M) 124 may have the property that φ(E (M)) has a trivial second component.

Pseudo random number generator 126 may generate an output number 128. Pseudo random number generator 126 may be based on either message M 104, signer private key Priv(S) 114, or both. Processor 112 may forward random number 128, signer private key Priv(S) 114, and φ 140 to cloaking element generator 130. Cloaking element generator 130 may, in response, produce cloaking elements v, $v_1$ 132 in the group G 122. Cloaking elements v, $v_1$ 132 may serve to cloak signer private key Priv(S) 114 as explained in more detail below.

Given an element s ∈ S, cloaking element generator 130 may generate cloaking elements v, $v_1$ 132 ∈G, termed cloaking elements associated with s. Cloaking elements v, $v_1$ 132 may facilitate signature generation and verification. Cloaking elements v, $v_1$ 132 may have images under the homomorphism φ that stabilizes elements (1,1) and (1, s) respectively. Definitionally, this means $(1,1)*(M_v, id)=(1, 1)$ and $(1, s)*(M_{v_1}, id)=(1, s)$ Processor 112 may forward encoded message 124, private key 114, and cloaking elements 132 to raw signature generator 160. Raw signature generator 160 may produce the element $(Priv(S)^{-1} v E(M) Priv(S) v_1)$, a raw signature 168 which may be a group element.

Processor 112 may forward raw signature 168 and message 104 to final signature generator 170. Final signature generator 170 may apply rewrite operation R 154 to raw signature 168 and message M 104 to produce final signature 108. Final signature 108 may include a rewritten signature 154 and message 104. It is noted that E-multiplication of final signature 108 by public key 116 would cause cloaking elements 132 to disappear. Cloaking elements 132 may thus prevent potential weaknesses which could arise in examples where the conjugacy problem in group G is not sufficiently difficult. Final signature 108 may take the form:

$$\text{Final Signature}=(\mathcal{R}(Priv(S)^{-1} v E(M) Priv(S) v_1), M)$$

Figure 2:
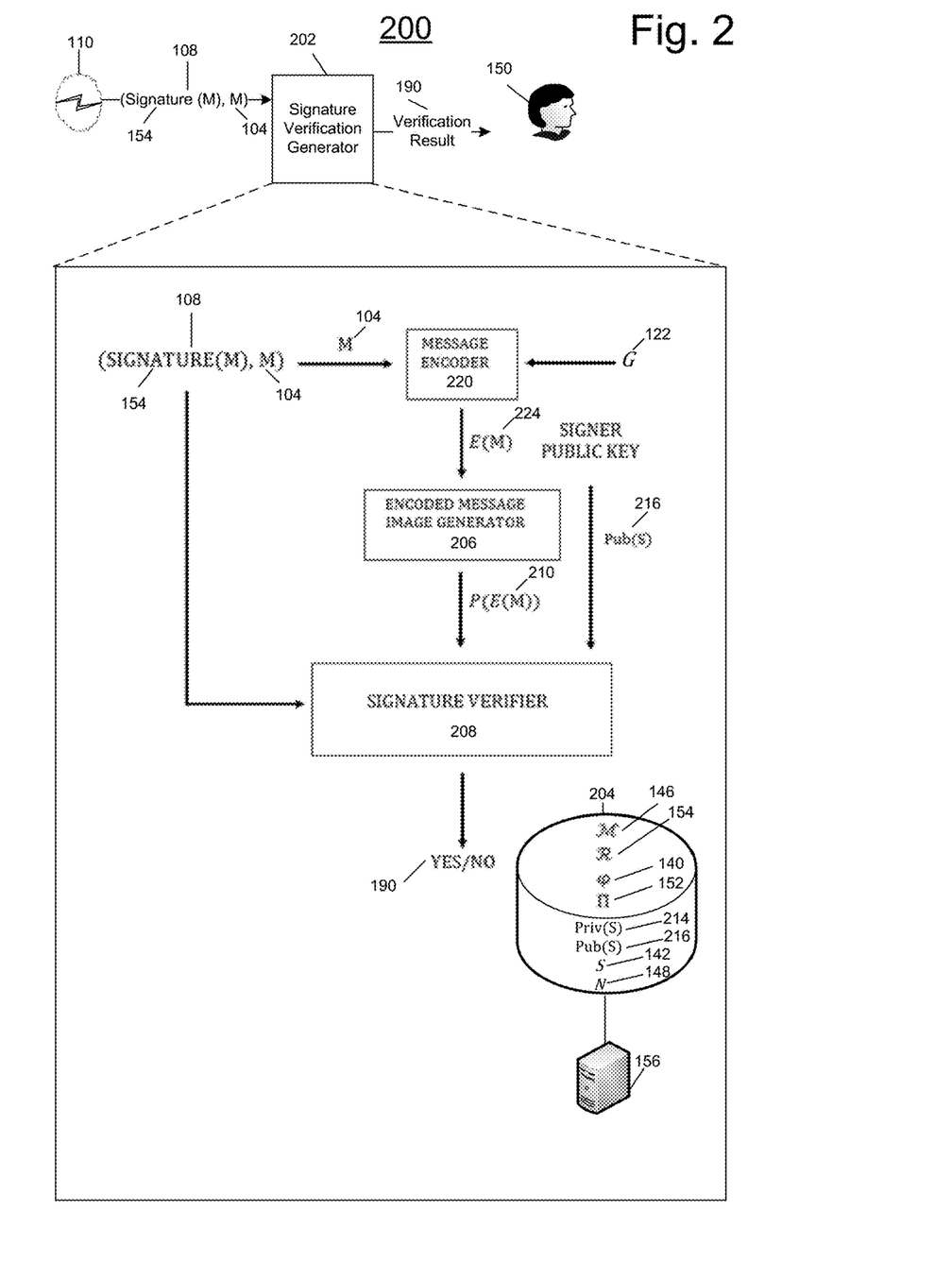
FIG. 2 is a drawing of a communication system in accordance with an embodiment of the invention.

FIG. 2 is a drawing of a communication system 200 in accordance with an embodiment of the invention. Communication system 200 may include a signature verification generator 202 and network 110. Signature verification generator 202 may include a processor 156, a memory 204, a message encoder 220, an encoded message image generator 206, and a signature verifier 208, all configured to be in communication with each other. Memory 204 may store group S 142, group G 122, group M 146, group N 148, homomorphism φ 140, homomorphism "Π" 152, signer private key Priv (S) 214, a signer public key Pub(S) 216, and obscure rewriting operation $\mathcal{R}$ 154.

Signature verification generator 202 may receive final signature 108 including rewritten signature 154 and message 104 over network 110. Processor 156 may forward message M 104 and group G 122 to message encoder 220. Message encoder 220 may associate a unique element in a free subgroup of group G 122 to message M 104 to produce an encoded message E(M) 224.

Processor 156 may forward encoded message 224 to encoded message image generator 206. Encoded message image generator 206 may apply a function to encoded message 124 to produce output P(E(M)) 210 which may be an ordered pair in N×S:

$$P(E(M))=(1,1)*(M_{E(M)}, id) \in N \times S.$$

Processor 156 may forward output P(E(M)) 210, final signature 108 and public key Pub(S) 216 to signature verifier 208. Signature verifier 208 may process public key 216 and rewritten signature 108 as follows:

$$Pub(S)* \mathcal{R} (Priv(S)^{-1} v E(M) Priv(S) v_1),$$

to produce a first computation. Signature verifier 208 may process first components of P(E(M)) and Pub(s) as follows:

$$\text{First Component}(P(E(M))) \cdot \text{First Component}(Pub(S)),$$

to produce a second computation.

Signature verifier 208 may compare the first and second computations to generate verification result 190. If signature verifier 208 determines that the outputs of the above computations are equal, signature verifier may output verification result 190 as YES indicating that the signature has been verified as produced by the signer. If signature verifier 208 determines that the outputs of the above computations are not equal, signature verifier may output verification result 190 as NO indicating that the signature has not been verified as produced by the signer.

Among other benefits, a system in accordance with this disclosure may enable a receiving device to authenticate and verify the origin of a message. A receiving device may be able to demonstrate the integrity of a message at a future point in time. A receiving device may be able to prevent a signer of a message from denying generation and transmission of a message that has been verified to have been sent by a signer. A system in accordance with this disclosure may be resistant to attacks. A receiving device may be able to execute a verification of a message sender relatively rapidly.

EXAMPLE

Let G denote the n-strand braid group with Artin generators, $\{b_1, b_2, \ldots, b_{n-1}\}$ which are subject to the following identities:

$$b_i b_{i+1} b_i = b_{i+1} b_i b_{i+1}, (i=1, \ldots, n-1),$$

and $$b_i b_j = b_j b_i, (i,j \text{ with } |i-j| \geq 2).$$

Let M denote the group of n×n matrices with n-variable Laurent polynomial entries, and let S denote the group of permutations on n symbols. We extend the action of S to an action on n-variable Laurent polynomials, and further to an action on the group $\mathcal{M}$. Forming the semidirect product, $\mathcal{M} \rtimes S$, we define the function φ: G→ $\mathcal{M} \rtimes S$ as follows. Each generator $b_i$ is associated with the permutation $\sigma_i$ which maps i→i+1, i+1→i, and leaves $$\{1, \ldots, i-1, i+2, \ldots, n\}$$

fixed, and an element $\beta = b_{i_1}^{\in_1} b_{i_2}^{\in_2} \ldots b_{i_k}^{\in_k} \in G$, ($i_j \in \{1, \ldots, n-1\}$, and $\in_j = \pm 1$), is associated with the product of the permutations $\sigma_\beta = \sigma_{i_1} \cdot \sigma_{i_2} \cdot \ldots \cdot \sigma_{i_k}$. Associate to each $b_i$ the ordered pair of the n×n colored Burau matrix $CB(b_i)$ whose entries are polynomials in the N variables $\{t_1, t_2, \ldots, t_n\}$, together with the permutation 94 $_i$. These ordered pairs form a semi-direct product $\mathcal{M} \rtimes S$, and allow for the function φ: G→ $\mathcal{M} \rtimes S$, to be defined:

$$\phi(\beta) = (CB(\beta), \sigma_\beta).$$ In the case n=4, the matrices $CB(b_1)$, $CB(b_2)$, and $CB(b_3)$ are defined as follows (the general case is entirely analogous):

$$\begin{pmatrix} -t_1 & 1 & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ t_2 & -t_2 & 1 & 0 \\ 0 & 0 & 1 & 0 \\ 0 & 0 & 0 & 1 \end{pmatrix}, \begin{pmatrix} 1 & 0 & 0 & 0 \\ 0 & 1 & 0 & 0 \\ 0 & t_3 & -t_3 & 1 \\ 0 & 0 & 0 & 1 \end{pmatrix}.$$

Further we observe that in the case n=4, with the general case being entirely analogous, $CB(b_1^{-1})$, $CB(b_2^{-1})$, and $CB(b_3^{-1})$ are given by the following matrices, respectively:

$$\begin{pmatrix} -\frac{1}{t_2} & \frac{1}{t_2} & 0 & 0 \\ 0 & 1 & 0 & 0 \\ 0 & 0 & 1 & 0 \\ 0 & 0 & 0 & 1 \end{pmatrix}, \begin{pmatrix} 1 & 1 & 0 & 0 \\ 1 & -\frac{1}{t_3} & \frac{1}{t_3} & 0 \\ 0 & 0 & 1 & 0 \\ 0 & 0 & 0 & 1 \end{pmatrix}, \begin{pmatrix} 1 & 1 & 0 & 0 \\ 0 & 1 & 0 & 0 \\ 0 & 1 & -\frac{1}{t_4} & \frac{1}{t_4} \\ 0 & 0 & 0 & 1 \end{pmatrix}.$$

Referring to the instance of E-multiplication specified above, the group N is specified as the group of n×n matrices over a finite field $F_q$, and the function $\Pi: \mathcal{M} \to N$ is specified by a collection of n invertible elements in $F_q$, termed t-values: the function $\Pi$ evaluates every in $M \in \mathcal{M}$ at the specified t-values. In this example of the preferred embodiment E-multiplication is specifically given by $$(N_0, s_0)*(M, s) = (N_0 \cdot \Pi(^{s_0}M), s_0 s).$$

This instance, which is based on the n-strand braid group, G, may be specified by the following data:

A specified rewriting operation, which may be a canonical form algorithm, or a modified canonical form algorithm, $\mathcal{R}: B_n \to B_n$.

A Pseudo Random Number Generator, PRNG, which may be responsive to either or both the message, M, and the Signer's private key, Priv(S).

A collection of n nonzero elements in the finite field $F_q$, termed T-values, which are denoted by $\{\tau_1, \tau_2, \ldots, \tau_N\}$.

Two integers 1<a<b<n, such that $\tau_a = \tau_b = 1$.

The Signer has a private key, Priv(S)∈G, and a public key $$Pub(S) = (1,1)*(M_{Priv(S)}, s_{Priv(S)}).$$

Referring again to FIG. 1, first user 102 inputs the Message M 104 to be signed, or the output of a cryptographic hash function applied to the Message M, to message encoder 120, which is responsive to the input of a free subgroup of the group G 122. The n-strand braid group contains a free subgroup, which is contained in the pure braid subgroup and is generated by the collection of braids $$b_{n-1} \cdot b_{n-2} \cdot \ldots \cdot b_{i+1} \cdot b_i^2 \cdot b_{i+1}^{-1} \cdot \ldots \cdot b_{n-1}^{-1} (i=1, \ldots, n-2).$$

Since subgroups of free groups are themselves free, there are many possible choices of free subgroups that may specify the message encoder 120. Message M 104 may be broken into blocks of length 4, and each such block may be associated with a unique power of one of the braids specified above. In addition, the output of the message encoder 120, may satisfy the property that the second component of φ(E(M)) is the identity. The output of message encoder 120, encoded message E(M) 124, is forwarded to raw signature generator 160. Concurrent to the message being forwarded to the message encoder 120, the Signer's private key Priv(S) 114, an element of the group G 122, is forwarded to both the cloaking element generator 130 and the raw signature generator 160. Cloaking element generator 130 is responsive to the output number 128 of a Pseudo Random Number Generator, PRNG 126. PRNG 136 may itself be responsive to either or both the message M 104 and the Singer's private key, Priv(S) 114 if it is desirable that the apparatus produce the same signature of the message M 104 whenever it is called upon. If it is desirable to produce a signature that is not stagnant, PRNG 126 may operate independently of the message M 104. Both group G 122, and homomorphism φ 140 are forwarded to the cloaking element generator 130, which outputs two cloaking elements $v, v_1$ 132 of the group G 122 that satisfy the cloaking property:

$$(1,1)*(M_v, id)=(1,1)$$

$$(\Pi(M_{Priv(S)}), s_{Priv(S)})*(M_{v_1}, id)=(\Pi(M_{Priv(S)}), s_{Priv(S)}).$$

In the present example, the cloaking elements $v, v_1$ 132 may be generated in the following way. In general given a permutation, $\sigma \in S_N$, there are many braids $\beta \in G$ that have $\sigma$ as its associated permutation. In addition, if such a braid $\beta$ is multiplied by a braid whose associated permutation is the identity, termed a pure braid, the resulting product will yet again have the same permutation as the original braid $\beta$. Furthermore, any two braids, which have the same associated permutation, will differ by a pure braid. The cloaking element generator 130 may produce the element $v \in G$ by choosing an $i \in \{1, 2, \ldots, n-1\}$ via the output number 128 of PRNG 126, choosing a permutation in $S_N$ that maps $i \to a$, $i+1 \to b$, and then producing an element in $\gamma \in G$ which has said associated permutation. The element $\gamma$ may be multiplied by an element in the pure braid subgroup, and this new element, which may also be denoted by $\gamma$, may be used by the cloaking element generator 130 to produce the element $v$. The cloaking element generator 130 may produce element $v$ by forming the product in the group G 122, $$v=\gamma b_i^2 \gamma^{-1}.$$

The output of this process will satisfy the essential identity $$(1,1)*(M_v, id)=(1,1).$$

The cloaking element generator 130 may produce the element $v_1 \in G$ by choosing an $i \in \{1, 2, \ldots, n-1\}$ via the input of the output number 128 of PRNG 126, choosing a permutation in $S_N$ that maps $$i \to s_{Priv(S)}^{-1}(a), i+1 \to s_{Priv(S)}^{-1}(b)$$

and then producing an element in $\gamma_1 \in G$ which has said associated permutation. The element $\gamma_1$ may be multiplied by an element in the pure braid subgroup, and this new element, which may also be denoted by $\gamma_1$, may be used by the cloaking element generator 130 to produce the element $v_1$. The cloaking element generator 130 may produce the element $v_1$ by forming the product in the group G 122, $$v_1=\gamma_1 b_i^2 \gamma_1^{-1}.$$

The output of this process will satisfy the essential identity $$(\Pi(M_{Priv(S)}), s_{Priv(S)})*(M_{v_1}, id)=(\Pi(M_{Priv(S)}), s_{Priv(S)}).$$

The cloaking elements $v, v_1$ 132 are forwarded to the raw signature generator 160. The raw signature generator 160 has in memory the set of group elements $$\{E(M), Priv(S), v, v_1\}$$

and proceeds to output the group element 168

$$Priv(S)^{-1} v E(M) Priv(S) v_1.$$

Group element 168, together with the original message M 104, which may be the result of a cryptographic hash function applied to a message, is forwarded to the final signature generator 170. The final signature generator 170 applies the rewriting operation, $\mathcal{R}$ 154, which was specified in the public data, to group element 168 $Priv(S)^{-1} v E(M) Priv(S) v_1$. The action of rewriting operation is to obscure all of the individual components of group element 168 $Priv(S)^{-1} v E(M) Priv(S) v_1$, and the expression generated by the rewriting operation $\mathcal{R}$ 154 is denoted $$\mathcal{R}(Priv(S)^{-1} v E(M) Priv(S) v_1).$$

A feature of the cloaking elements $v, v_1$ 132 is that when the output of the final signature generator 170 is E-multiplied by the public key Pub(S) 116 of the signer, the cloaking elements $v, v_1$ 132 disappear. The output of the final signature generator 170 is final signature 108 ordered pair $$\text{Final Signature}=(\mathcal{R}(Priv(S)^{-1} v E(M) Priv(S) v_1), M).$$

Signature verification generator 202 may receive final signature 108 ($\mathcal{R}(Priv(S)^{-1} v E(M) Priv(S) v_1)$, M), including rewritten signature 154 and message 104. Signature verification generator 202 may forward message M 104 and group G 122 to message encoder 220. Message encoder 220 may associate a unique element in a free subgroup of group G 122 to message M 104 to produce an encoded message E(M) 224. Signature verification generator 202 may forward encoded message E(M) 224 to encoded message image generator 206. Encoded message image generator 206 may apply a function to encoded message 124 to produce output P(E(M)) 210 which may be an ordered pair in N×S, $$P(E(M))=(1,1)*(M_{E(M)}, id) \in N \times S.$$

Signature verification generator 202 may forward output P(E(M)) 210, final signature 108, and public key Pub(S) 216 to signature verifier 208. Signature verifier 208 may process public key 216 and rewritten signature 108 by execution of the E-multiplication $$Pub(S)*\mathcal{R}(Priv(S)^{-1} v E(M) Priv(S) v_1),$$

and the group multiplication of the first components of P(E(M)) and Pub (S), $$\text{First Component}(P(E(M))) \cdot \text{First Component}(Pub(S)).$$

If the outputs of the above-executed computations are equal, signature verifier 208 outputs YES, which indicates the Signature has been verified. If the above executed computations are not equal, the signature verifier 208 outputs NO, which indicates the Signature cannot be verified as having been produced by the Signer.

Figure 3:
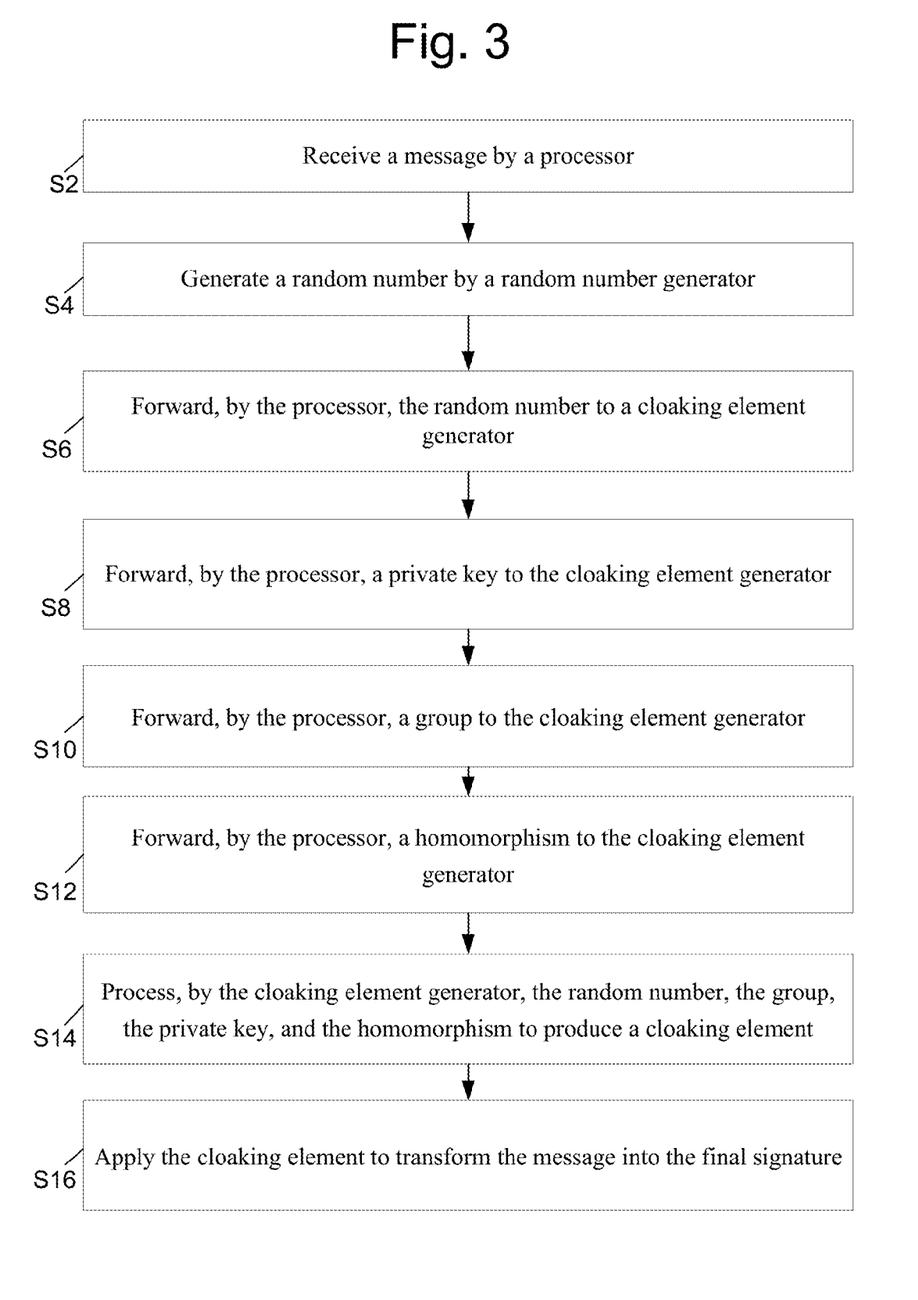
FIG. 3 is a flow diagram illustrating a process which could be performed in accordance with an embodiment of the invention.

Referring to FIG. 3, there is shown a process which could be performed in accordance with an embodiment of the invention. The process could be performed using, for example, system 100 discussed above and may be used to generate a final signature.

As shown, at step S2, a processor may receive a message. At step S4, a random number generator may generate a random number.

At step S6, the processor may forward the random number to a cloaking element generator. At step S8, the processor may forward a private key to the cloaking element generator.

At step S10, the processor may forward a group to the cloaking element generator. The private key may be an element in the group. The group may be equipped with an obscuring rewriting method. At step S12, the processor may forward a homomorphism to the cloaking element generator.

At step S14, the cloaking element generator may process the random number, the group, the private key, and the homomorphism to produce a cloaking element. At step S16, the processor may apply the cloaking element to transform the message into the final signature.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a final cloaked signature, the method comprising:
   receiving a message by a processor;
   generating a random number by a random number generator of the processor;
   processing, by a cloaking element generator of the processor, the random number, a braid group $\{b_1, b_{n-1}\}$, a private key that is an element of the braid group, and a homomorphism to produce a cloaking element that is an element of the braid group and that acts as a stabilizer, thereby satisfying a predetermined cloaking equation taking a form wherein $(1,1)*(M_v, id)=(1,1)$ and $(1,s)*(M_{v1}, id)=(1,s)$, where * denotes E-multiplication, s is an element of a permutation group, v and $v_1$ are braid group elements that act as cloaking elements, $M_v$ and $M_{v1}$ are colored Burau matrices associated with v and $v_1$, respectively, and id is an identity permutation in the permutation group;
   processing, by a message encoder of the processor, the private key and the message to produce an encoded message;
   processing, by a raw signature generator of the processor, the cloaking element and the encoded message to produce a raw signature;
   processing, by a final signature generator of the processor, the raw signature and the message to produce the final cloaked signature, the processing including applying the cloaking element to at least the message to transform the message into the final cloaked signature, the applying including applying the cloaking element to the encoded message, the final cloaked signature providing verification of an origin of the message, the final cloaked signature taking a form $(R(Priv(S)^{-1} \ v \ E(M) \ Priv(S) \ v_1), M)$, where $Priv(S)$ denotes a signer private key, M denotes the message, $E(M)$ denotes the encoded message, S is a permutation group on n symbols, and N is an n×n matrix group over a finite field, and R denotes a rewriting operator that is a function executing a sequence of insertions and/or deletions of braid identities in the braid group to derive a new expression of the braid group, the braid identities comprising: $b_i \ b_{\{i+1\}} \ b_i = b_{\{i+1\}} \ b_i \ b_{\{i+1\}}$ and $b_i \ b_j = b_j \ b_i$ (when $|i-j|>$ or $=2$); and
   sending, by the processor, the final cloaked signature to a receiver.

2. The method of claim 1, wherein the message encoder of the processor is configured to produce the encoded message such that the encoded message is an element of a free subgroup of the group.

3. The method of claim 1, wherein the final cloaked signature includes a rewritten signature and the message.

4. The method of claim 1, wherein processing by the final signature generator includes applying a rewriting operation to the raw signature.

5. The method of claim 1, wherein applying the cloaking element to at least the message includes applying the cloaking element to a hash of at least the message.

6. The method of claim 1, wherein the random number generator generates the random number based on the message or based on the braid group.

7. A signature generator comprising:
   a memory; and
   a processor in communication with the memory, the processor comprising a random number generator configured to generate a random number, a message encoder, a raw signature generator, a final signature generator, and a cloaking element generator, wherein the processor is configured to:
   receive a message;
   process, by the cloaking element generator, a braid group, a private key that is an element of the braid group $\{b_1, b_{n-1}\}$, and a homomorphism to produce a cloaking element that is an element of the braid group and that acts as a stabilizer, thereby satisfying a predetermined cloaking equation taking a form wherein $(1,1)*(M_v, id)=(1,1)$ and $(1,s)*(M_{v1}, id)=(1, s)$, where * denotes E-multiplication, s is an element of a permutation group, v and $v_1$ are braid group elements that act as cloaking elements, $M_v$ and $M_{v1}$ are colored Burau matrices associated with v and $v_1$, respectively, and id is an identity permutation in the permutation group;
   process, by the message encoder, the private key and the message to produce an encoded message;
   process, by the raw signature generator, the cloaking element, the private key, and the encoded message to produce a raw signature;
   process, by the final signature generator, the raw signature and the message to produce the final cloaked signature, the processing including applying the cloaking element to at least the message to transform the message into a final cloaked signature, the applying including applying the cloaking element to the encoded message, the final cloaked signature providing verification of the signature generator as an origin of the message, the final cloaked signature taking a form $(R(Priv(S)^{-1} \ v \ E(M) \ Priv(S) \ v_1), M)$, where $Priv(S)$ denotes a signer private key, M denotes the message, $E(M)$ denotes the encoded message, S is a permutation group on n symbols, and N is an n×n matrix group over a finite field, and R denotes a rewriting operator that is a function executing a sequence of insertions and/or deletions of braid identities in the braid group to derive a new expression of the braid group, the braid identities comprising: $b_i \ b_{\{i+1\}} \ b_i \ b_{\{i+1\}}$ and $b_1 \ b_j = b_j \ b_i$ (when $|i-j|>$ or $=2$); and
   send the final cloaked signature to a receiver.

8. The signature generator of claim 7, wherein the processor is configured to produce, by the message encoder, the encoded message such that the encoded message is an element of a free subgroup of the group.

9. The signature generator of claim 7, wherein the final cloaked signature includes a rewritten signature and the message.

10. The signature generator of claim 7, wherein the final signature generator is configured to apply a rewriting operation to the raw signature.

11. A method to generate a verification result for a signature, the method comprising:
- receiving, by a processor, a final signature that includes a cloaked signature and a message from a purported message origin;
- processing, by a message encoder of the processor, a braid group $\{b_1, b_{n-1}\}$ and the message to produce an encoded message;
- processing, by an encoded message image generator of the processor, the encoded message to produce an ordered pair of elements of the braid group, wherein the ordered pair takes the same structure as a public key;
- processing, by a signature verifier of the processor, the public key and the cloaked signature as $Pub(S)*(R(Priv(S)^{-1} \ v \ E(M) \ Priv(S) \ v_1), M)$ to produce a first computation, where $*$ denotes E-multiplication, $Pub(S)$ denotes the public key, $Priv(S)$ denotes a signer private key, M denotes the message, E(M) denotes the encoded message, $v_1$ denotes a braid group element that acts as a cloaking element, and R denotes a rewriting operator that is a function executing a sequence of insertions and/or deletions of braid identities in the braid group to derive a new expression of the braid group, the braid identities comprising: $b_i \ b_{\{i+1\}} \ b_i \ b_{\{i+1\}} \ b_i \ b_{\{i+1\}}$ and $b_i \ b_j = b_j \ b_i$ (when $|i-j| >$ or $=2$);
- processing, by the signature verifier of the processor, the ordered pair and the public key as First Component(P(E(M)))·First Component(Pub(S)) to produce a second computation, where P(E(M)) denotes the ordered pair according to $P(E(M))=(1,1)*(M_{E(M)}, id) \in N \times S$, $M_{E(M)}$ is a colored Burau matrix associated the encoded message, id is an identity permutation in the permutation group, S is a permutation group on n symbols, and N is an n×n matrix group over a finite field; and
- comparing, by the processor, the first and second computation to generate the verification result, wherein:
- the verification result indicates that the final signature was produced by the purported message origin in response to the comparing indicating that the first and second computations are equal, and
- the verification result indicates that the final signature was not produced by the purported message origin in response to the comparing indicating that the first and second computations are not equal.

12. The method of claim 5, wherein the hash is a hash of the private key and the message.

13. The signature generator of claim 7, wherein applying the cloaking element to at least the message includes applying the cloaking element to a hash of at least the message.

14. The signature generator of claim 13, wherein the hash is a hash of the private key and the message.

* * * * *